United States Patent
Vemulapalli et al.

(10) Patent No.: US 10,783,611 B2
(45) Date of Patent: Sep. 22, 2020

(54) FRAME-RECURRENT VIDEO SUPER-RESOLUTION

(71) Applicant: Google LLC, Mountain View, CA (US)

(72) Inventors: Raviteja Vemulapalli, Seattle, WA (US); Matthew Brown, Seattle, WA (US); Seyed Mohammad Mehdi Sajjadi, Tuebingen (DE)

(73) Assignee: Google LLC, Mountain View, CA (US)

( * ) Notice: Subject to any disclaimer, the term of this patent is extended or adjusted under 35 U.S.C. 154(b) by 340 days.

(21) Appl. No.: 15/859,992

(22) Filed: Jan. 2, 2018

(65) Prior Publication Data

US 2019/0206026 A1    Jul. 4, 2019

(51) Int. Cl.
| | |
|---|---|
| *G06T 3/40* | (2006.01) |
| *G06T 3/00* | (2006.01) |
| *G06T 5/50* | (2006.01) |
| *G06T 7/246* | (2017.01) |
| *G06N 20/00* | (2019.01) |

(52) U.S. Cl.
CPC ............ *G06T 3/4053* (2013.01); *G06N 20/00* (2019.01); *G06T 3/0093* (2013.01); *G06T 3/4046* (2013.01); *G06T 5/50* (2013.01); *G06T 7/248* (2017.01); *G06T 2207/20081* (2013.01)

(58) Field of Classification Search
None
See application file for complete search history.

(56) References Cited

U.S. PATENT DOCUMENTS

| | | | |
|---|---|---|---|
| 2017/0262705 A1* | 9/2017 | Li | G06K 9/00718 |
| 2019/0279383 A1* | 9/2019 | Angelova | G06T 7/55 |

FOREIGN PATENT DOCUMENTS

| | | |
|---|---|---|
| EP | 2525320 | 11/2012 |
| WO | WO2017178806 | 10/2017 |

OTHER PUBLICATIONS

Chiang, et al., "Efficient Image Warping and Super-Resolution", Proceedings of the Third IEEE Workshop on Applications of Computer Vision, WACV, Dec. 2-4 1996, Sarasota, Florida, pp. 56-61.

(Continued)

*Primary Examiner* — David Perlman

(74) *Attorney, Agent, or Firm* — Dority & Manning, PA

(57) ABSTRACT

The present disclosure provides systems and methods to increase resolution of imagery. In one example embodiment, a computer-implemented method includes obtaining a current low-resolution image frame. The method includes obtaining a previous estimated high-resolution image frame, the previous estimated high-resolution frame being a high-resolution estimate of a previous low-resolution image frame. The method includes warping the previous estimated high-resolution image frame based on the current low-resolution image frame. The method includes inputting the warped previous estimated high-resolution image frame and the current low-resolution image frame into a machine-learned frame estimation model. The method includes receiving a current estimated high-resolution image frame as an output of the machine-learned frame estimation model, the current estimated high-resolution image frame being a high-resolution estimate of the current low-resolution image frame.

16 Claims, 10 Drawing Sheets

(56) References Cited

OTHER PUBLICATIONS

International Search Report and Written Opinion for Application No. PCT/US2019/012064, dated Mar. 6, 2019, 13 pages.
Dong, et al., "Image Super-Resolution Using Deep Convolutional Networks", IEEE Transactions on Pattern Analysis and Machine Intelligence, vol. 38 No. 2, Feb. 1, 2016, pp. 295-307.
Shi et al., "Real-Time Single Image and Video Super-Resolution Using an Efficient Sub-Pixel Convolutional Neural Network", arxiv.org, Cornell University Library, Ithaca, New York, Sep. 16, 2016, XP080727223, 10 pages.

* cited by examiner

FRAME-RECURRENT VIDEO SUPER-RESOLUTION

FIELD

The present disclosure relates generally to machine learning. More particularly, the present disclosure relates to performing super-resolution on imagery such as videos using machine-learned models.

BACKGROUND

Super-resolution is a classic problem in image processing that addresses the question of how to construct a high-resolution (HR) version of an image from a low-resolution (LR) version of the image such as, for example, a downscaled version of the image. With the rise of deep learning, super-resolution has received significant attention from the research community over the past few years. While high-frequency details are typically reconstructed exclusively from spatial statistics in the case of single image super-resolution, temporal relationships in the input can be exploited to improve reconstructions for video super-resolution. Therefore, certain super-resolution techniques attempt to combine the information from as many LR frames as possible to reach the best video super-resolution results.

Certain video super-resolution methods approach the problem by combining a batch of LR frames to estimate a single HR frame and running this scheme in a sliding window fashion over the entire video. This approach effectively divides the task of video super-resolution into a large number of separate multi-frame super-resolution subtasks. However, this approach has a number of weaknesses. First, this approach is computationally expensive since each input frame needs to be processed several times. Second, generating each output frame separately reduces the system's ability to produce temporally consistent frames, which can result in unpleasing flickering artifacts. That is, each output frame is estimated independently conditioned on the input frames, limiting the system's ability to produce temporally consistent results.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to increase resolution of imagery. The method can include obtaining, by one or more computing devices, a current low-resolution image frame. The method can include obtaining, by the one or more computing devices, a previous estimated high-resolution image frame, the previous estimated high-resolution frame being a high-resolution estimate of a previous low-resolution image frame. The method can include warping, by the one or more computing devices, the previous estimated high-resolution image frame based on the current low-resolution image frame. The method can include inputting, by the one or more computing devices, the warped previous estimated high-resolution image frame and the current low-resolution image frame into a machine-learned frame estimation model. The method can include receiving, by the one or more computing devices, a current estimated high-resolution image frame as an output of the machine-learned frame estimation model, the current estimated high-resolution image frame being a high-resolution estimate of the current low-resolution image frame.

Another example aspect of the present disclosure is directed to a computing system. The computing system can include at least one processor, a machine-learned recurrent super-resolution model. The machine-learned recurrent super-resolution model can include a machine-learned frame estimation model, and a machine-learned flow estimation model. The computing system can include at least one tangible, non-transitory computer-readable medium that stores instructions that, when executed by the at least one processor, cause the at least one processor to perform operations. The operations can include obtaining data representing a current low-resolution frame of a video. The operations can include obtaining data representing a previous estimated high-resolution frame of the video. The operations can include inputting the current low-resolution frame and the previous estimated high-resolution frame into the recurrent super-resolution model. The operations can include obtaining, in response to inputting the frames, an output of the recurrent super-resolution model that includes data representing a high-resolution estimate of the current low-resolution frame of the video.

Another example aspect of the present disclosure is directed to a non-transitory-computer-readable medium that stores instructions that when executed by one or more computing devices, cause the one or more computing devices to perform operations. The operations can include warping a previous high-resolution frame of a video based at least in part on a motion estimate of a video. The operations can include inputting the warped previous high-resolution frame and a current low-resolution frame of the video into a machine-learned frame estimation model. The operations can include obtaining a current estimated high-resolution frame as an output of the machine-learned frame estimation model. The operations can include evaluating a loss function to obtain a loss value that describes a difference between the current estimated high-resolution frame and a current ground truth high-resolution frame. The operations can include adjusting one or more parameters of the machine-learned frame estimation model to reduce the loss value.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
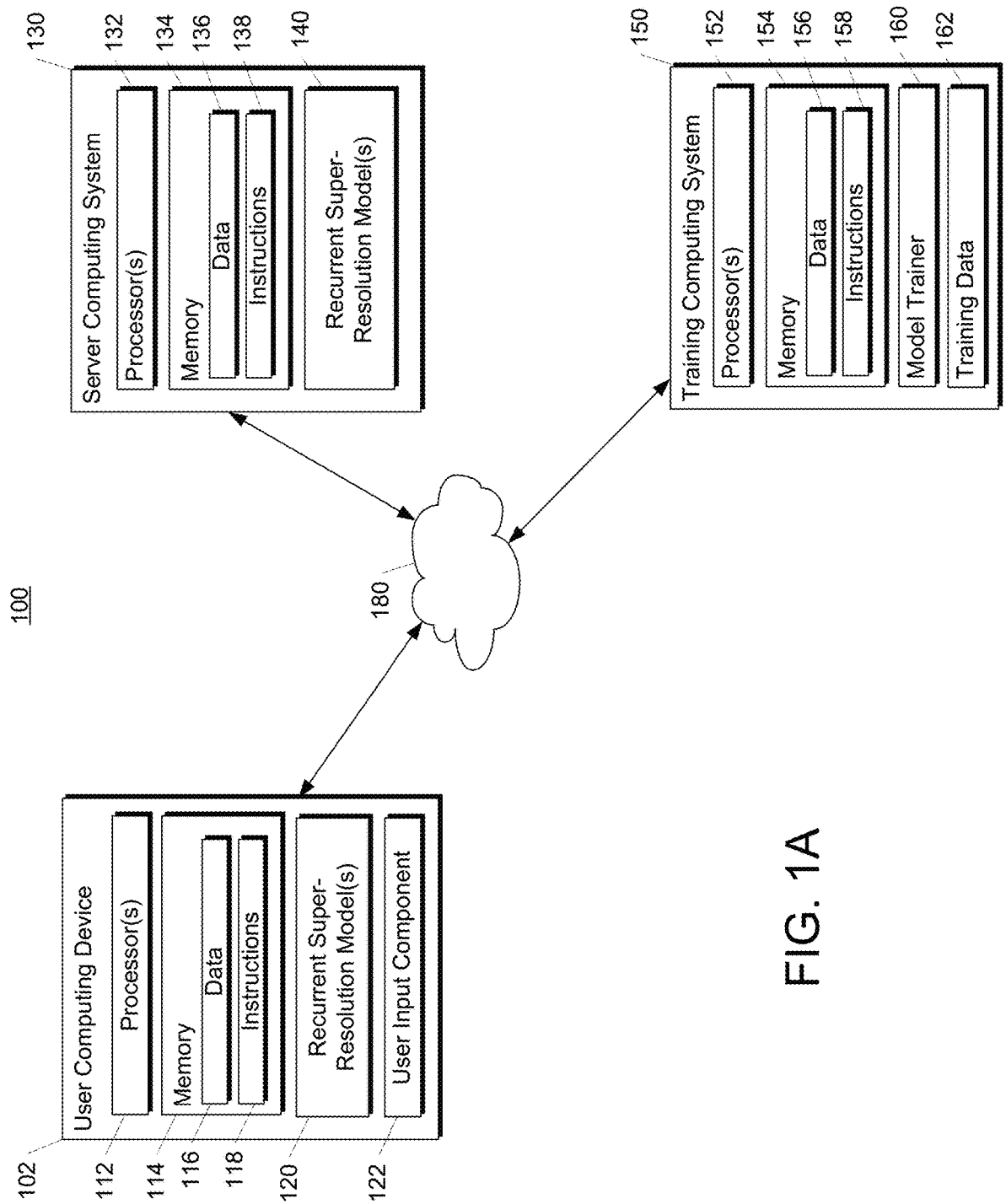
FIG. 1A depicts a block diagram of an example computing system that performs super-resolution on imagery according to example embodiments of the present disclosure.

Reference numerals that are repeated across plural figures are intended to identify the same features in various implementations.

DETAILED DESCRIPTION

Overview

Example aspects of the present disclosure are directed to systems and methods that include or otherwise leverage a machine-learned recurrent super-resolution model to super-resolve imagery such as image frames of a video. In particular, the recurrent super-resolution model can be structured according to an end-to-end trainable frame-recurrent video super-resolution framework that uses a previously inferred high-resolution (HR) estimate to super-resolve the subsequent low-resolution (LR) frame. This framework can naturally encourage temporally consistent results and reduce the computational cost by warping only one image in each step. Furthermore, due to their recurrent nature, the systems and methods of the present disclosure have the ability to assimilate a large number of previous frames without increased computational demands. Extensive evaluations and comparisons with previous methods validate the strengths of the systems and methods of the present disclosure and demonstrate that the proposed framework is able to significantly outperform the current state of the art.

More particularly, aspects of the present disclosure are directed to a recurrent super-resolution model that enables super-resolving image frames of a video. The recurrent super-resolution model can include a machine-learned frame estimation model and a machine-learned flow estimation model. The recurrent super-resolution model can be implemented or otherwise executed by a computing system. For example, a computing device such as, for example, a user computing device (e.g., smartphone, tablet, personal assistant device, etc.) can implement the recurrent super-resolution model to super-resolve image frames corresponding to a low-resolution version of a video (e.g., low-resolution image frames), and obtain an estimated high-resolution version of the video. As another example, the computing system can obtain a set of consecutive low-resolution video image frames, sequentially input the set of low-resolution image frames into the recurrent super-resolution model, and obtain a set of estimated high-resolution image frames.

In some implementations, the computing system can obtain a current low-resolution image frame of a low-resolution video, and a previous estimated high-resolution image frame that is a high-resolution estimate of a previous low-resolution image frame of the low-resolution video. The computing system can input the current low-resolution image frame and the previous estimated high-resolution image frame into the recurrent super-resolution model.

In some implementations, the computing system can warp the previous estimated high-resolution image frame based on the current low-resolution image frame. The computing system can input the warped previous estimated high-resolution image frame and the current low-resolution image frame into a machine-learned frame estimation model.

In some implementations, prior to warping a previous high-resolution image frame, the computing system can determine a flow between the previous low-resolution image frame and the current low-resolution image frame. The computing system can warp the previous estimated high-resolution image frame based on the flow.

As one example, the flow between the previous low-resolution image frame and the current low-resolution image frame can be an optical flow. As another example, the flow can be or include a parametric translation data. As yet another example, the flow can be or include video coding data.

In some implementations, the computing system can determine the flow between the previous low-resolution image frame and the current low-resolution image frame by inputting the previous low-resolution image frame and the current low-resolution image frame into a machine-learned flow estimation model. The computing system can receive the flow as an output of the machine-learned flow estimation model. For example, the computing system can receive an optical flow between the previous low-resolution image frame and the current low-resolution image frame as an output of the machine-learned flow estimation model.

In some implementations, the computing system can determine a low-resolution flow between the previous low-resolution image frame and the current low-resolution image frame. For example, the computing system can receive the low-resolution optical flow between the previous low-resolution image frame and the current low-resolution image frame as an output of the machine-learned flow estimation model. The computing system can upscale the low-resolution flow to obtain a high-resolution flow. The computing system can warp the previous estimated high-resolution image frame based on the high-resolution flow.

In some implementations, prior to inputting the warped previous estimated high-resolution image frame into a machine-learned frame estimation model, the computing system can map the warped previous estimated high-resolution image frame to the current low-resolution image-frame. As one example, the computing system can perform a space-to-depth transformation on the warped previous estimated high-resolution image frame. For example, the space-to-depth transformation can map the warped previous estimated high-resolution image frame to a low-resolution space of the current low-resolution image frame. As another example, the computing system can upsample the current low-resolution image frame to a high-resolution space of the warped previous estimated high-resolution image frame to map the warped previous estimated high-resolution image frame to the current low-resolution image-frame.

In some implementations, the computing system can input the warped previous estimated high-resolution image frame and the current low-resolution image frame into a machine-learned frame estimation model. In response, the machine-learned frame estimation model can output a current estimated high-resolution image frame, where the current estimated high-resolution image frame is a high-resolution estimate (i.e., super-resolved version) of the current low-resolution image frame.

In some implementations, the computing system can input the warped previous estimated high-resolution image frame and the current low-resolution image frame into a machine-learned frame estimation model by concatenating a low-resolution mapping of the warped previous estimated high-resolution image frame with the current low-resolution image frame in a channel dimension, and feeding the concatenated images to the machine-learned frame estimation model.

According to another aspect of the present disclosure, the current estimated high-resolution image frame can be passed back for use as an input in the next iteration. That is, the current estimated high-resolution image frame can be used as the previous estimated high-resolution image frame at the next iteration, in which a next subsequent low resolution image frame is super-resolved.

In some implementations, the machine-learned recurrent super-resolution model can include one or more neural networks (e.g., deep neural networks), support vector machines, decision trees, ensemble models, k-nearest neighbors models, Bayesian networks, or other types of models including linear models and/or non-linear models. Example neural networks can include feed-forward neural networks, convolutional neural networks, recurrent neural networks (e.g., long short-term memory (LSTM) recurrent neural networks, gated recurrent unit (GRU) neural networks), or other forms of neural networks. For example, the machine-learned flow estimation model and/or the machine-learned frame estimation model can be or include one or more of the models described above.

In some implementations, a training computing system can train the recurrent super-resolution model to determine a high-resolution estimate of an input image frame, based on a training dataset. The training dataset can include a plurality of videos. For example, the training dataset can be generated based on a plurality of original high-resolution videos that are downsampled (e.g., by a factor of 2), to have clean high-resolution ground truth, from which a plurality of patches (e.g., of size 256×256) are extracted to generate a plurality of high-resolution videos to include in the training dataset.

In some implementations, the training dataset can include a plurality of low-resolution videos to input into the recurrent super-resolution model when training the recurrent super-resolution model. The plurality of low-resolution videos can be generated based on the plurality of high-resolution videos included in the training dataset. For example, each high-resolution image frame of the plurality of high-resolution videos included in the training dataset can be blurred (e.g., by applying a Gaussian blur with a standard deviation of 1.5), and downsampled (e.g., by sampling every fourth pixel in each dimension), to generate a plurality of low-resolution videos to include in the training dataset.

In some implementation, the training dataset can include a first portion of data corresponding to a set of low-resolution image frames from a low-resolution clip (e.g., of 10 consecutive image frames) extracted from the plurality of videos. The training dataset can further include a second portion of data corresponding to a set of original high-resolution image frames from a high-resolution clip extracted from the plurality of videos that corresponds to the low-resolution clip.

In some implementations, to train the recurrent super-resolution model, the training computing system can input a first portion of a set of ground-truth data (e.g., the first portion of the training dataset corresponding to a set of low-resolution image frames) into the recurrent super-resolution model. In response to receipt of such first portion, the recurrent super-resolution model can output an estimated high-resolution image frame for each input low-resolution image frame. This output of the machine-learned model predicts the remainder of the set of ground-truth data (e.g., the second portion of the training dataset corresponding to a set of original high-resolution image frames). After such prediction, the training computing system can apply or otherwise determine a loss function that compares the estimated high-resolution image frames output by the recurrent super-resolution model to the remainder of the ground-truth data which the model attempted to predict. The training computing system then can backpropagate the loss function through the recurrent super-resolution model to train the model (e.g., by modifying one or more weights associated with the model). This process of inputting ground-truth data, determining a loss function and backpropagating the loss function through the recurrent super-resolution model can be repeated numerous times as part of training the recurrent super-resolution model. For example, the process can be repeated for each of numerous sets of ground-truth data provided within the training dataset.

According to another aspect of the present disclosure, in some implementations, the models and frameworks described herein can further include one or more memory channels that assist in combating occlusions included in the estimated image frames. For example, in some implementations, the machine-learned super-resolution model can include one or more recurrent connections that allow the retention of hidden unit values from one iteration to the next.

In one example application, the systems and methods of the present disclosure can be used to perform video decompression. For example, an HR video can be compressed or encoded, for example, by downsampling some or all of the HR frames of the HR video, thereby generating a compressed video. This downsampling is an extremely computationally cheap encoding technique. The video can be transmitted over a network, stored, etc. in its compressed form, thereby providing bandwidth savings, storage space savings, etc. due to its smaller memory footprint. The systems and methods described herein can then be used to decompress or decode the LR frames of the video. In particular, the systems and methods described herein can operate to super-resolve each of the LR frames of the video back into estimates of the original HR frames.

In some implementations, most of the HR frames can be downsampled while certain HR frames are not downsampled and remain as HR keyframes. The keyframes can be evenly spaced or can be spaced according to scene change data, motion data, etc. Each HR keyframe can be used as an initial seed to assist with recurrently super-resolving the following LR frames until the next HR keyframe is reached.

As one example, one may plug in the original HR frame $I_{t-1}^{HR}$ in place of the estimated $I_{t-1}^{est}$ for every K-th frame. This could enable an efficient video compression method where only one in K HR-frames needs to be stored while the remaining frames would be reconstructed by the model.

The use of a recurrent super-resolution model in the systems and methods of the present disclosure provide a number of technical advantages. For example, by using a previously inferred high-resolution (HR) estimate to super-resolve the subsequent low-resolution (LR) frame, this framework can naturally encourage temporally consistent results. That is, by iteratively providing past inferences as inputs for the next iteration, data can be retained across iterations, thereby providing more temporally consistent outputs. Thus, by propagating information from past image frames to later image frames via an estimated high-resolution image frame that is recurrently passed through time, the systems and methods can recreate fine details and produce temporally consistent results without increasing computations.

As another example technical effect and benefit, example systems and methods described herein can reduce the computational cost of performing super-resolution by warping only one image in each step. For example, certain existing video super-resolution methods approach the problem by combining a batch of LR frames to estimate a single HR frame and running this scheme in a sliding window fashion over the entire video. This approach effectively divides the task of video super-resolution into a large number of separate multi-frame super-resolution subtasks. However, this approach is computationally expensive since each input frame needs to be processed several times. In contrast, example systems and methods described herein perform only one warping operation per iteration, thereby reducing the number of processing steps for each super-resolved frame. Thus, due to the recurrent nature of the framework, the systems and methods of the present disclosure have the ability to assimilate a large number of previous frames without increased computational demands.

Furthermore, the recurrent super-resolution model can directly estimate a full RGB high-resolution image frame of a video, negating a necessity of post-processing an output of the model. In addition, in some implementations, the system is end-to-end trainable and does not require any pre-training stages.

As yet another example technical effect and benefit, in some implementations, all or most computationally intensive operations can be performed in LR space. For example, the previous HR estimate can be mapped into LR space using the space-to-depth transformation. Running the machine-learned super-resolution model in LR space provides the advantages of reducing the memory footprint and increasing the receptive field when compared to a super-resolution model that would operate in HR space.

Example Devices and Systems

With reference now to the FIGS., example embodiments of the present disclosure will be discussed in further detail.

FIG. 1A depicts a block diagram of an example computing system 100 that performs super-resolving of one or more image frames of a video according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more recurrent super-resolution models 120. For example, the recurrent super-resolution models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example recurrent super-resolution models 120 are discussed with reference to FIGS. 2-5.

In some implementations, the one or more recurrent super-resolution models 120 can be received from the server computing system 130 over network 180, stored in the user computing device memory 114, and then used or otherwise implemented by the one or more processors 112. In some implementations, the user computing device 102 can implement multiple parallel instances of a single recurrent super-resolution model 120 (e.g., to perform parallel super-resolving of image frames across multiple instances of the recurrent super-resolution models 120).

More particularly, in some implementations, the one or more recurrent super-resolution models 120 can output one or more high-resolution image frames of a video based on a set of consecutive low-resolution frames of the video. For example, the user computing device 102 can input each image frame of a low-resolution version of a video into the recurrent super-resolution models 120, and in response, the recurrent super-resolution models 120 can output a corresponding estimated high-resolution image frame. For example, the estimated high-resolution image frame can approximate a corresponding original high-resolution image frame of a high-resolution version of the video. Alternatively, a corresponding original high-resolution image frame may not exist. That is, the recurrent super-resolution model 120 can generate an estimated high-resolution image frame of a low resolution image frame, even if no such high resolution version previously existed.

Additionally or alternatively, one or more recurrent super-resolution models 140 can be included in or otherwise stored and implemented by the server computing system 130 that communicates with the user computing device 102 according to a client-server relationship. For example, the recurrent super-resolution models 140 can be implemented by the server computing system 140 as a portion of a web service (e.g., a video streaming service). Thus, one or more models 120 can be stored and implemented at the user computing device 102 and/or one or more models 140 can be stored and implemented at the server computing system 130.

The user computing device 102 can also include one or more user input components 122 that can receive user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned recurrent super-resolution models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-5.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the recurrent super-resolution models 120 and/or 140 based on a set of training data 162. The training data 162 can include, for example, a plurality of high-resolution videos at a resolution of 720p, 1080p, and/or 4k. Any suitable resolution video can be included in the training data 162, however, as explained in greater detail below.

In some implementations, the training data 162 can be generated based on a plurality of original high-resolution videos. For example, the plurality of original high-resolution videos can be downsampled (e.g., by a factor of 2), to generate clean high-resolution ground truth. A plurality of patches (e.g., of size 256×256) can be extracted from the clean high-resolution ground truth, to generate a plurality of high-resolution videos to include in the training data 162.

In some implementations, the training data 162 can include a plurality of low-resolution videos to input into the recurrent super-resolution models 120 and/or 140 during training. The plurality of low-resolution videos can be generated based on a plurality of high-resolution videos included in the training data 162. For example, each high-resolution image frame of the plurality of high-resolution videos included in the training data 162 can be blurred (e.g., by applying a Gaussian blur with a standard deviation of 1.5), and downsampled (e.g., by sampling every $4^{th}$ pixel in each dimension), to generate a plurality of low-resolution videos to include in the training data 162.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory, and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
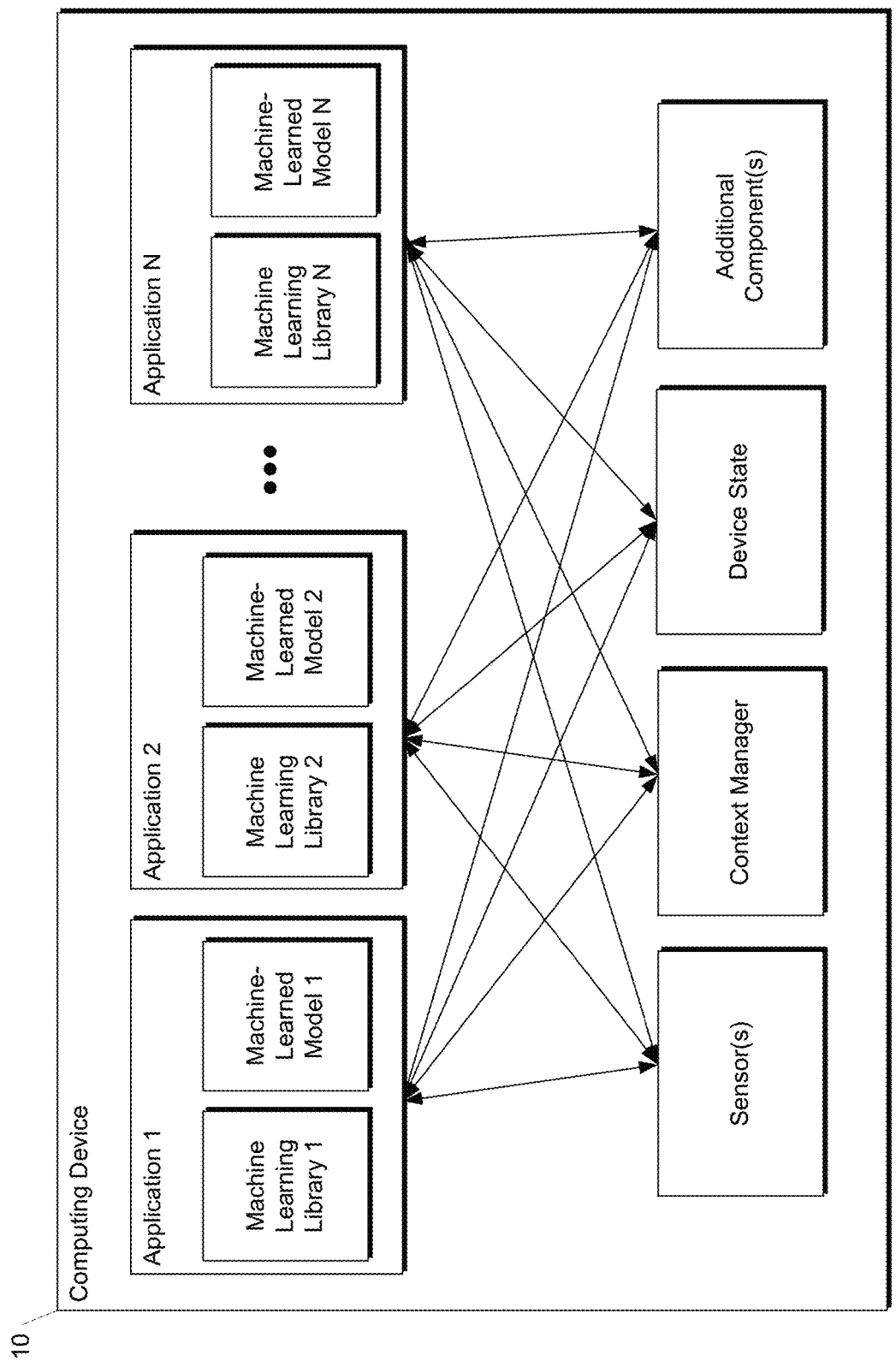
FIG. 1B depicts a block diagram of an example computing device according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
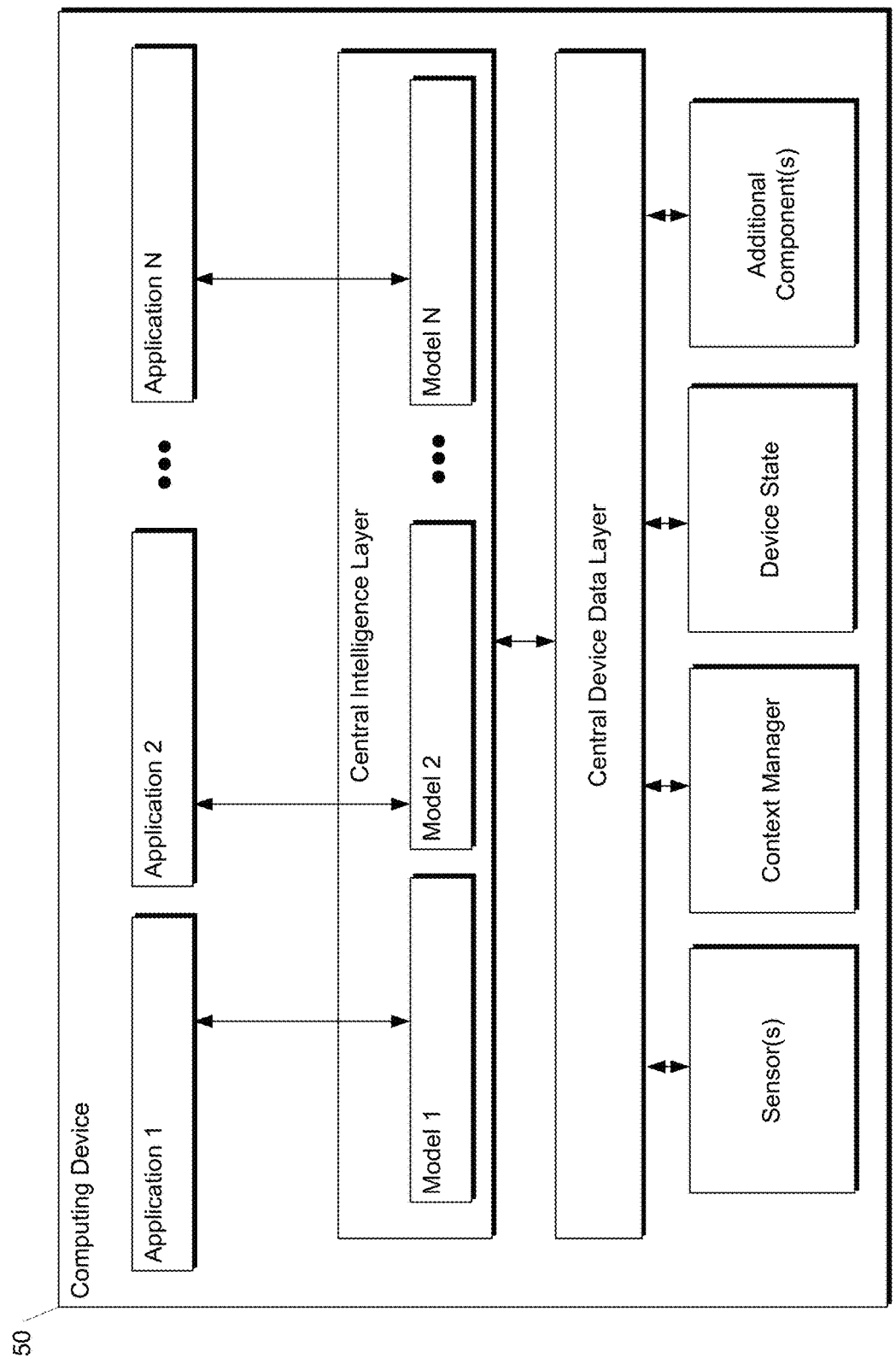
FIG. 1C depicts a block diagram of an example computing device according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
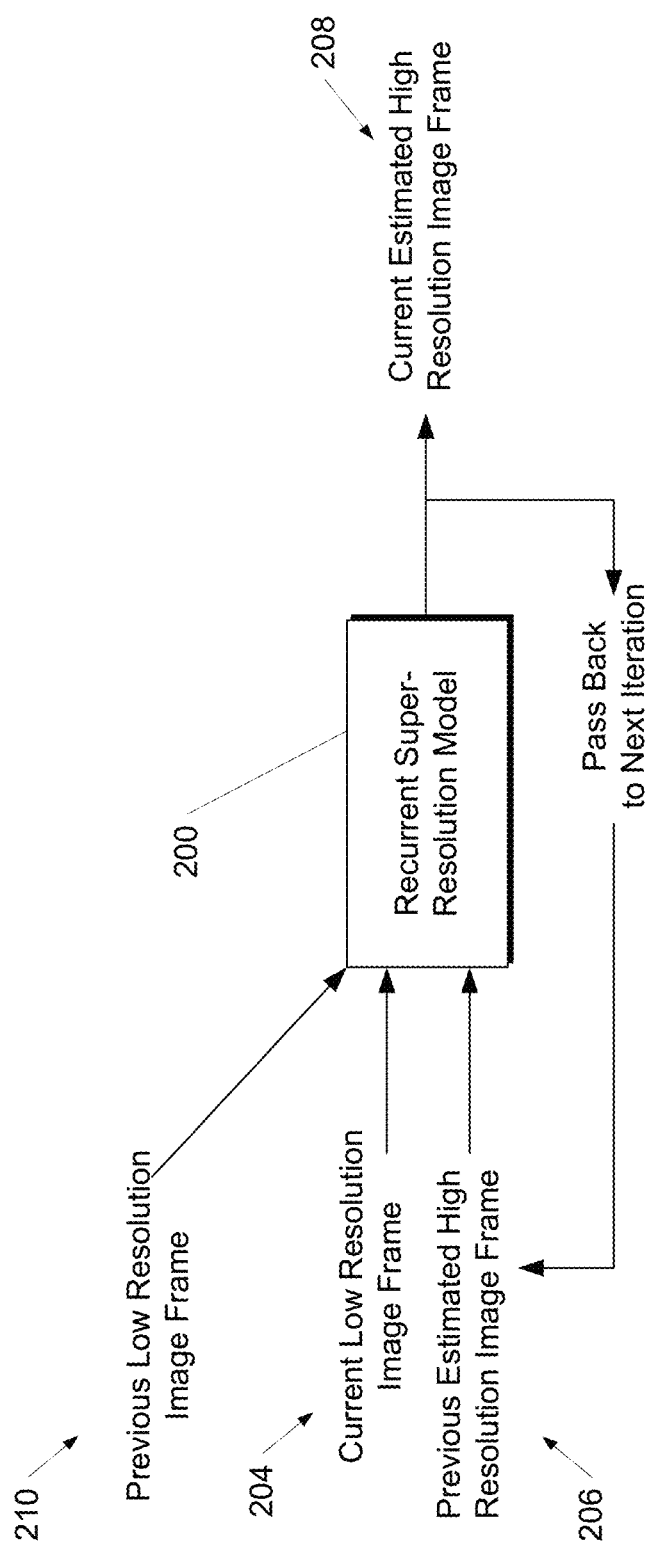
FIG. 2 depicts a block diagram of an example machine-learned recurrent super-resolution model according to example embodiments of the present disclosure.

FIG. 2 depicts a block diagram of an example recurrent super-resolution model 200 according to example embodiments of the present disclosure. In some implementations, the recurrent super-resolution model 200 is trained to receive input data that includes a current low-resolution image frame 204 and a previous estimated high-resolution image frame 206; and, as a result of receipt of the current low-resolution image frame 204 and previous estimated high-resolution image frame 206, provide a current estimated high-resolution image frame 208.

In some implementations, the recurrent super-resolution model 200 is trained to receive further input data that includes a previous low-resolution image frame 210. As a result of receipt of the previous low-resolution image frame 210 and the current low-resolution image frame 204, the recurrent super-resolution model 200 can estimate a low-resolution flow between the previous low-resolution image frame 210 and the current low-resolution image frame 204. The recurrent super-resolution model 200 can provide the current estimated high-resolution image frame 208 based at least in part on the low-resolution flow.

In other implementations, the recurrent super-resolution model 200 does not necessarily receive the previous low-resolution image frame 210. For example, the recurrent super-resolution model 200 can downsample the previous estimated high-resolution image frame 206 and determine the low-resolution flow between the downsampled version of the previous estimated high-resolution image frame 206 and the current low-resolution image frame 204.

Figure 3:
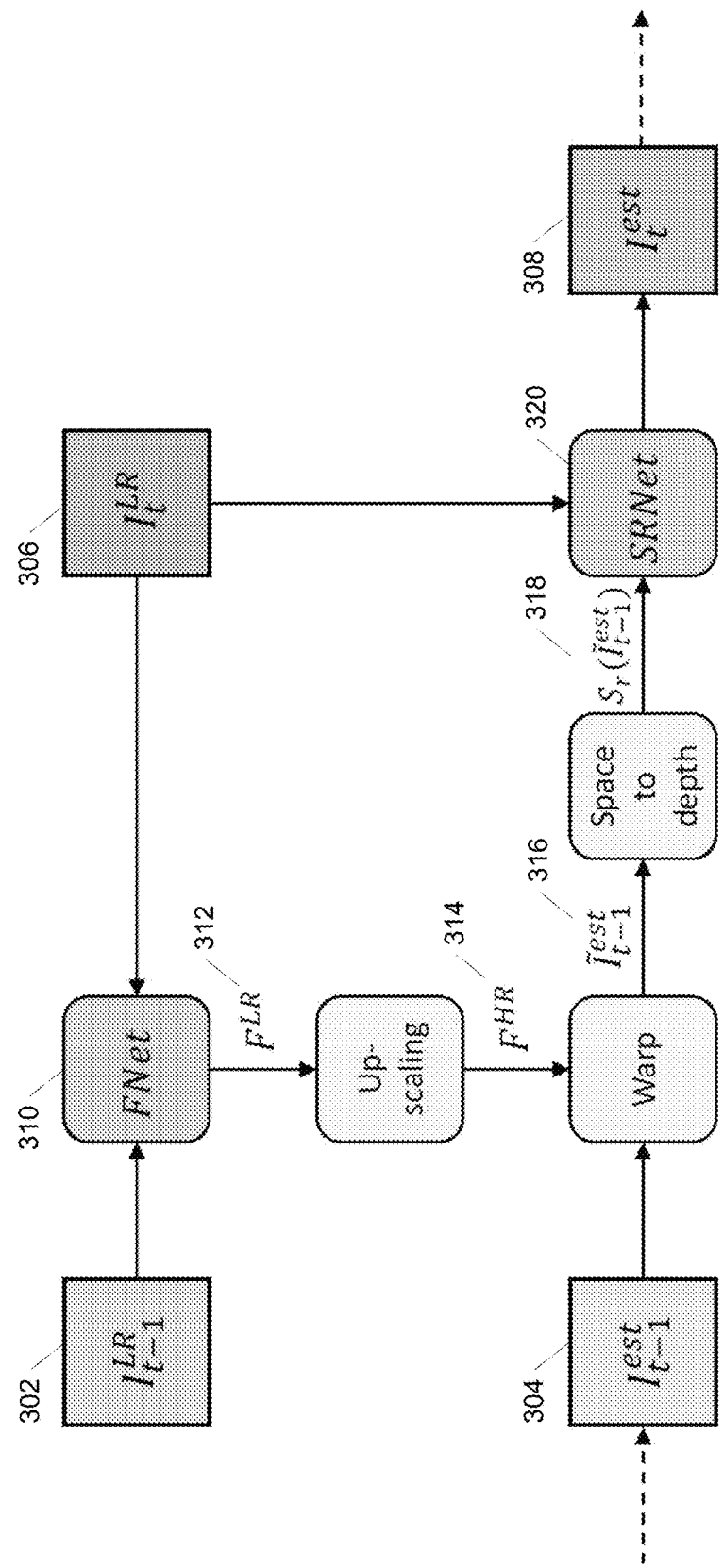
FIG. 3 depicts a block diagram of an example end-to-end trainable frame-recurrent video super-resolution framework according to example embodiments of the present disclosure.

FIG. 3 depicts a block diagram of an example end-to-end trainable frame-recurrent video super-resolution framework 300 according to example embodiments of the present disclosure. In particular, FIG. 3 provides one example framework 300 that can be used to implement the recurrent super-resolution model 200 of FIG. 2. Thus, the recurrent super-resolution model 200 of FIG. 2 can be as shown in FIG. 3 or can have other structures, data flows, and/or components.

A computing system (e.g., user computing device 102) can use the framework 300 to perform super-resolving of a current low-resolution image frame 306 to obtain a current estimated high-resolution image frame 308.

One example notation that can be used in conjunction with the framework 300 is as follows: Let $I_t^{LR} \in [0,1]^{H \times W \times C}$ denote the t-th LR video frame obtained by downsampling a HR frame $I_t^{HR} \in [0,1]^{sH \times sW \times C}$ by a scale factor s. Given a set of consecutive LR video frames, one example goal of video super-resolution is to generate HR estimates $I_t^{est}$ that approximate the original HR frames $I_t^{HR}$ under some metric.

Referring to FIG. 3, the computing system can input a current low-resolution image frame 306 and a previous low-resolution image frame 304 into a machine-learned flow estimation model 310 to obtain an estimated flow-map 312 between the previous low-resolution image frame 304 and the current low-resolution image frame 306. For example, the computing system can obtain, as an output of the machine-learned flow estimation model 310, a normalized low-resolution flow-map $F^{LR} = FNet(I_{t-1}^{LR}, I_t^{LR}) \in [-1,1]^{H \times W \times 2}$ that assigns each pixel location in $I_t^{LR}$ a position in $I_{t-1}^{LR}$.

Figure 7:
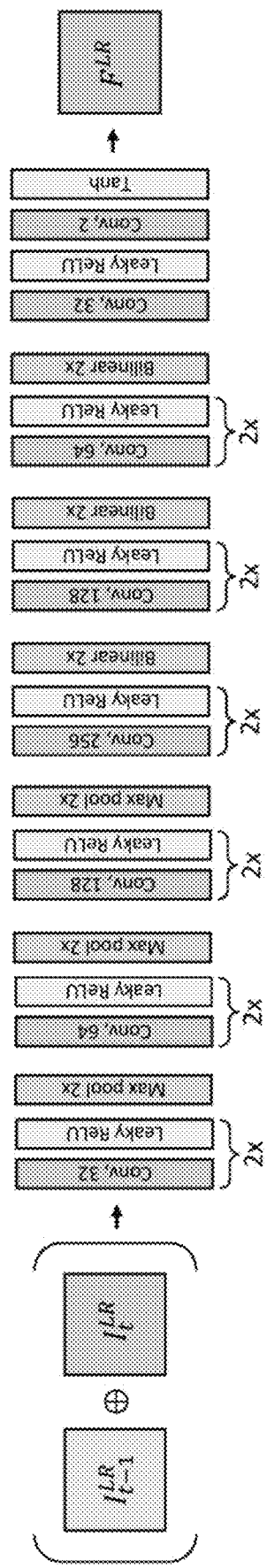
FIG. 7 depicts a block diagram of an example architecture of a machine-learned frame estimation model according to example embodiments of the present disclosure.

As one example, FIG. 7 provides one example network architecture that can be used to implement the machine-learned flow estimation model 310. Other model architectures can be used instead of the example shown in FIG. 7. The example network architecture shown in FIG. 7 can be fully convolutional and can work in LR space. In some implementations, all convolutions can use 3×3 kernels with stride 1. The notation 2× indicates that the corresponding block is duplicated and the leaky ReLU units can use a leakage factor of 0.2.

Referring again to FIG. 3, the computing system can upscale the estimated flow-map 312 to obtain a high-resolution flow-map 314. For example, the computing system can treat the flow-map $F^{LR}$ as an image, and upscale it using bilinear interpolation with scaling factor s which results in an HR flow-map $F^{HR}=\text{bi}(F^{LR})\in[-1,1]^{sH\times sW\times 2}$.

The computing system can use the high-resolution flow-map 314 to warp a previous estimated high-resolution image frame 304 and obtain a warped previous estimated high-resolution image frame 316. The previous estimated high-resolution image frame 304 can be estimated by a machine-learned frame estimation model 320 during a previous iteration. Alternatively, the previous estimated high-resolution image frame 304 can be a blank or black image (e.g., $I_0^{est}=0$). In some implementations, the warping can be performed as a differentiable function using bilinear interpolation. For example, the computing system can use the high-resolution flow-map $F^{HR}$ to warp the previously estimated image $I_{t-1}^{est}$ according to an optical flow from the previous frame onto the current frame to obtain the warped image $\tilde{I}_{t-1}^{est}=\text{WP}(I_{t-1}^{est}, F^{HR})$.

The computing system can map the warped previous estimated high-resolution image frame 316 to low-resolution space. For example, the computing system can use a space-to-depth transformation to obtain a low-resolution mapping 318 of the warped previous estimated high-resolution image 316. For example, the computing system can map the warped previous output $\tilde{I}_{t-1}^{est}$ to LR space using the space-to-depth transformation $S_s: [0,1]^{sH\times sW\times C} \rightarrow [0,1]^{H\times W\times s^2 C}$ which extracts shifted low-resolution grids from the image and places them into the channel dimension to obtain $S_s(I)_{i,j,k}=I_{si+k\%s,sj+(k/s)\%s,k/s^2}$, with zero-based indexing, modulus "%" and integer division "/".

The computing system can concatenate the low-resolution mapping 318 of the warped previous estimated high-resolution image with the current low-resolution image frame 306, and input the concatenated result into a machine-learned frame estimation model 320. For example, the computing system can concatenate the LR mapping of the warped previous output $\tilde{I}_{t-1}^{est}$ with the current low-resolution input frame $I_t^{LR}$ in the channel dimension, and feed the result $I_t^{LR}\oplus S_s(\tilde{I}_{t-1}^{est})$ into the frame estimation model 320.

The computing system can obtain, as an output of the machine-learned frame estimation model 320, an estimated high-resolution image frame 308. For example, the computing system can obtain, as an output of the machine-learned frame estimation model 320, the final estimate $I_t^{est}$, that can be represented as $\text{SRNet}(I_t^{LR}\oplus S_s(\text{WP}(I_{t-1}^{est},\text{bi}(\text{FNet}(I_{t-1}^{LR}, I_t^{LR})))))$. The final estimate $I_t^{est}$ can be passed back to serve as the previously estimated image $I_{t-1}^{est}$ for the next iteration, as indicated by the dashed lines.

Figure 8:
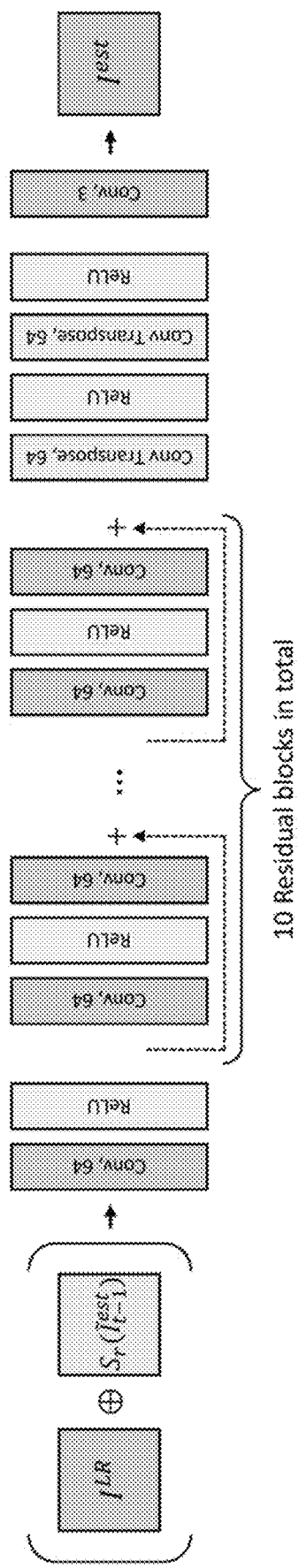
FIG. 8 depicts a block diagram of an example architecture of a machine-learned flow estimation model according to example embodiments of the present disclosure.

As one example, FIG. 8 provides one example network architecture that can be used to implement the machine-learned frame estimation model 320. Other model architectures can be used instead of the example shown in FIG. 8. The example network architecture shown in FIG. 8 can be fully convolutional and can work in LR space. In some implementations, all convolutions can use 3×3 kernels with stride 1 except the transposed convolutions which can use stride 2.

Figure 4A:
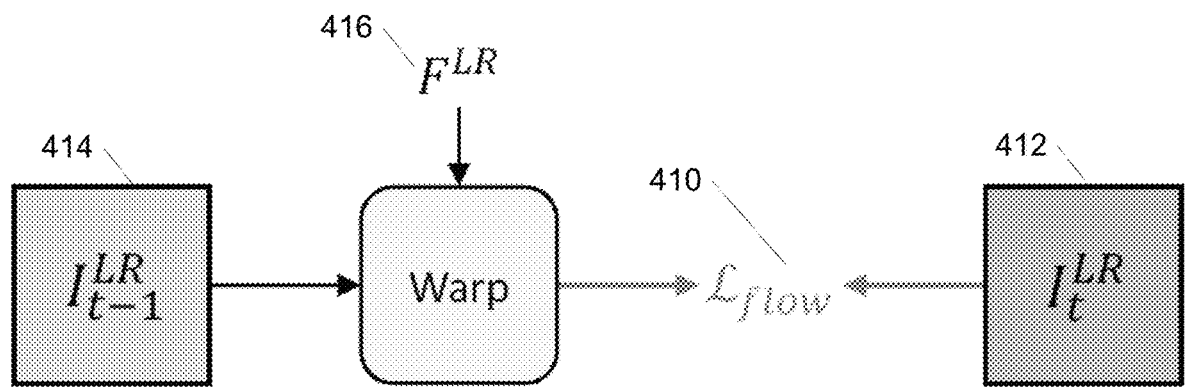
FIG. 4A depicts a block diagram of an example loss function used for training a machine-learned flow estimation model according to example embodiments of the present disclosure.

FIG. 4A depicts a block diagram 402 of an example loss function used for training a machine-learned flow estimation model according to example embodiments of the present disclosure. A computing system (e.g., training computing system 150) can train the flow estimation model by applying a loss 410 on a warped previous low-resolution image frame, with respect to a current low-resolution image frame 412. The warped previous low-resolution image frame can be obtained by warping a previous low-resolution image frame 414 based on an estimated flow-map 416. The estimated flow-map 416 can be a flow estimated by the flow estimation model based on the current low-resolution image frame 412 and the previous low-resolution image frame 414. The loss 410 can be backpropagated through the flow estimation model to train the model. For example, the computing system can apply a spatial mean squared error on the warped previous low-resolution image frame. As one possible example implementation, the loss 410 can be written as follows: $\mathcal{L}_{flow}=\|\text{WP}(I_{t-1}^{LR},F^{LR})-I_t^{LR}\|_2^2$.

Figure 4B:
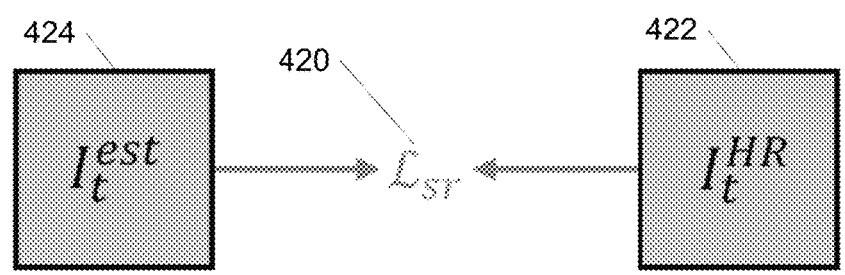
FIG. 4B depicts a block diagram of an example loss function used for training a machine-learned frame estimation model according to example embodiments of the present disclosure.

FIG. 4B depicts a block diagram 404 of an example loss function used for training a machine-learned frame estimation model according to example embodiments of the present disclosure. A computing system (e.g., training computing system 150) can train the frame estimation model by applying a loss 420 on a current estimated high-resolution image frame 424 output by the frame estimation model, with respect to a current ground-truth high-resolution image frame 422. The loss 420 can be backpropagated through the frame estimation model to train the model. In some implementations, the loss 420 can be backpropagated through both the machine-learned frame estimation model and the machine-learned flow estimation model. As one possible example implementation, the loss 420 can be written as follows: $\mathcal{L}_{sr}=\|I_t^{est}-I_t^{HR}\|_2^2$. Thus, in some implementations, the total loss used for training is $\mathcal{L}=\mathcal{L}_{sr}+\mathcal{L}_{flow}$.

Figure 5:
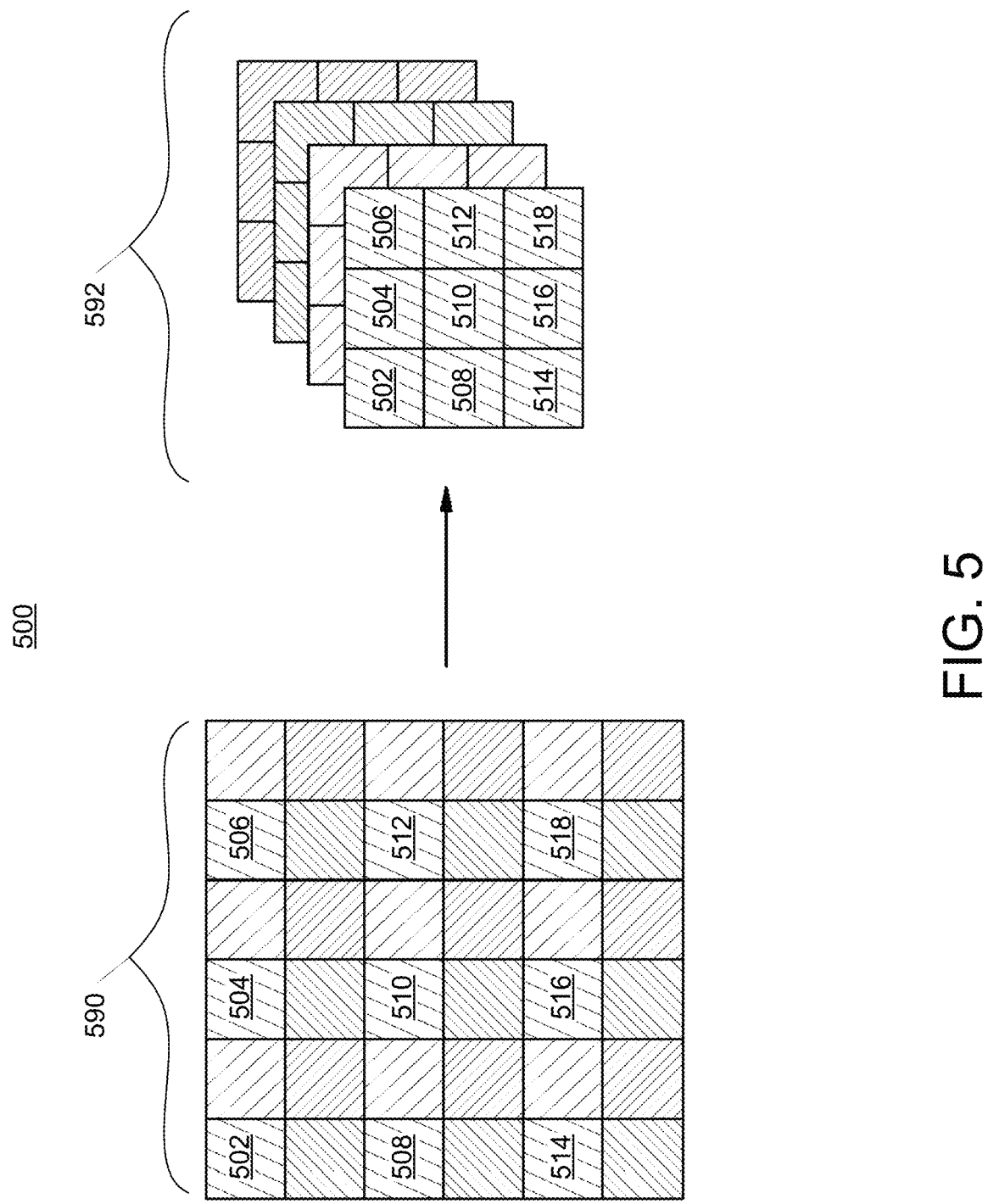
FIG. 5 depicts a diagram of an example space-to-depth transformation according to example embodiments of the present disclosure.

FIG. 5 depicts a diagram 500 of an example space-to-depth transformation according to example embodiments of the present disclosure. As shown in FIG. 5, a high-resolution image 590 can be mapped to a low-resolution space by extracting low-resolution grids from the high-resolution image 590 and shifting the low-resolution grids into a channel dimension, to obtain a low-resolution mapping 592. The high-resolution image 590 can include a plurality of portions from which one or more low-resolution grids can be extracted. Each portion can correspond to one or more pixels. For example, the portions 502, 504, 506, 508, 510, 512, 514, 516, and 518 can be extracted as a first low-resolution grid. The portions 502, 504, 506, 508, 510, 512, 514, 516, and 518 in the first low-resolution grid of the high-resolution image 590 can be shifted into the channel dimension as shown in the low-resolution mapping 592. As illustrated in FIG. 5, additional example low-resolution grids can be extracted from the high-resolution image 590 as indicated by the corresponding shading patterns used in the image 590 and the low-resolution mapping 592.

Example Methods

Figure 6:
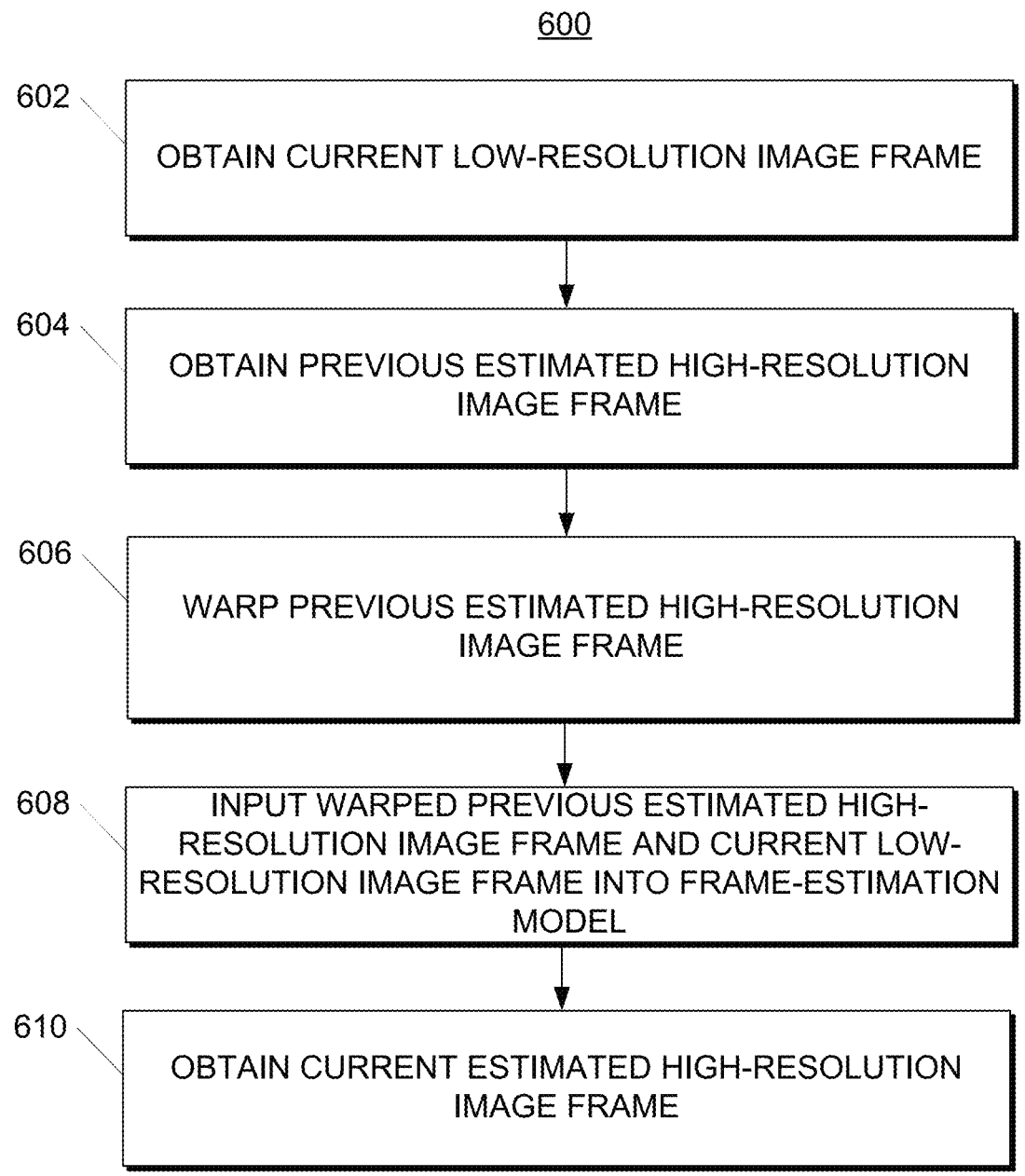
FIG. 6 depicts a flow chart diagram of an example method to super-resolve an image frame of a video according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain a current low-resolution image frame. For example, a computing system (e.g., user computing device 102, server computing system 130, training computing system 150) can obtain a current low-resolution image frame 306 of a video. The current low-resolution image frame 306 can be part of a set of consecutive low-resolution image frames of the video.

At 604, the computing system can obtain a previous estimated high-resolution image frame. For example, the computing system can obtain a previous estimated high-resolution image frame 304 of the video. The previous estimated high-resolution image frame 304 can be estimated by the recurrent super-resolution model in a previous iteration, based on a previous low-resolution image frame 302 of the video. As another example, the computing system can use a blank or black image as the previous estimated high-resolution image frame 304, when the current low-resolution image frame 306 is a first low-resolution image frame in the set of consecutive low-resolution image frames of the video.

At 606, the computing system can warp the previous estimated high-resolution image frame. For example, the computing system can warp the previous estimated high-resolution image frame 304 based on the current low-resolution image frame 306. Prior to warping the previous estimated high-resolution image frame 304, the computing system can determine a flow between a previous low-resolution image frame 302 and the current low-resolution image frame 306, and the computing system can warp the previous estimated high-resolution image frame 304 based on the flow. The computing system can determine the flow between the previous low-resolution image frame 302 and the current low-resolution image frame 306 by inputting the previous low-resolution image frame 302 and the current low-resolution image frame 306 into a machine-learned flow estimation model. The computing system can receive an estimated flow as an output of the flow estimation model. The computing system can receive the estimated flow as an optical flow between the previous low-resolution image frame 302 and the current low-resolution image frame 306. The computing system can receive the estimated flow as a low-resolution flow between the previous low-resolution image frame 302 and the current low-resolution image frame 306. The computing system can upscale the low-resolution flow to obtain a high-resolution flow, and the computing system can warp the previous estimated high-resolution image frame 304 based on the high-resolution flow.

At 608, the computing system can input the warped previous estimated high-resolution image frame and the current low-resolution image frame into a frame estimation model. For example, the computing system can input the warped previous estimated high-resolution image frame and the current low-resolution image frame 306 into the frame estimation model. Prior to inputting the warped previous estimated high-resolution image frame, the computing system can map the warped previous estimated high-resolution image frame to the current low-resolution image frame 306. The computing system can map the warped previous estimated high-resolution image frame to the current low-resolution image frame 306 by performing a space-to-depth transformation on the warped previous estimated high-resolution image frame. Alternatively, the computing system can map the warped previous estimated high-resolution image frame to the current low-resolution image frame 306 by upsampling the current low-resolution image frame 306. The computing system can concatenate the mapping of the warped previous estimated high-resolution image frame with the current low-resolution image frame 306, and input the concatenation into the frame estimation model 320.

At 610, the computing system can obtain a current estimated high-resolution image frame. For example, the computing system can receive, as an output of the frame estimation model 320, the current estimated high-resolution image frame 308.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to increase resolution of imagery, the method comprising:
   obtaining, by one or more computing devices, a current low-resolution image frame;
   obtaining, by the one or more computing devices, a previous estimated high-resolution image frame, the previous estimated high-resolution frame being a high-resolution estimate of a previous low-resolution image frame;
   determining, by the one or more computing devices, a flow between the previous low-resolution image frame and the current low-resolution image frame;
   warping, by the one or more computing devices, the previous estimated high-resolution image frame based on the current low-resolution image frame, wherein warping, by the one or more computing devices, the previous estimated high-resolution image frame based on the current low-resolution image frame comprises warping, by the one or more computing devices, the previous estimated high-resolution image frame based on the flow between the previous low-resolution image frame and the current low-resolution image frame;
   inputting, by the one or more computing devices, the warped previous estimated high-resolution image frame and the current low-resolution image frame into a machine-learned frame estimation model; and
   receiving, by the one or more computing devices, a current estimated high-resolution image frame as an output of the machine-learned frame estimation model, the current estimated high-resolution image frame being a high-resolution estimate of the current low-resolution image frame.

2. The computer-implemented method of claim 1, wherein determining, by the one or more computing devices, the flow between the previous low-resolution image frame and the current low-resolution image frame comprises:
  inputting, by the one or more computing devices, the previous low-resolution image frame and the current low-resolution image frame into a machine-learned flow estimation model; and
  receiving, by the one or more computing devices, the flow as an output of the machine-learned flow estimation model.

3. The computer-implemented method of claim 1, wherein determining, by the one or more computing devices, the flow between the previous low-resolution image frame and the current low-resolution image frame comprises determining, by the one or more computing devices, an optical flow between the previous low-resolution image frame and the current low-resolution image frame.

4. The computer-implemented method of claim 1, wherein:
  determining, by the one or more computing devices, the flow between the previous low-resolution image frame and the current low-resolution image frame comprises determining, by the one or more computing devices, a low-resolution flow between the previous low-resolution image frame and the current low-resolution image frame;
  the method further comprising upscaling, by the one or more computing devices, the low-resolution flow to obtain a high-resolution flow; and
  warping, by the one or more computing devices, the previous estimated high-resolution image frame based on the flow comprises warping, by the one or more computing devices, the previous estimated high-resolution image frame based on the high-resolution flow.

5. The computer-implemented method of claim 1, further comprising, prior to said inputting:
  mapping, by the one or more computing devices, the warped previous estimated high-resolution image frame to the current low-resolution image frame.

6. The computer-implemented method of claim 5, wherein mapping, by the one or more computing devices, the warped previous estimated high-resolution image frame to the current low-resolution image frame comprises performing, by the one or more computing devices, a space-to-depth transformation on the warped previous estimated high-resolution image frame to map the warped previous estimated high-resolution image frame to a low-resolution space of the current low-resolution image frame.

7. The computer-implemented method of claim 5, wherein mapping, by the one or more computing devices, the warped previous estimated high-resolution image frame to the current low-resolution image frame comprises upsampling the current low-resolution image frame to a high-resolution space of the warped previous estimated high-resolution image frame.

8. The computer-implemented method of claim 5, wherein inputting, by the one or more computing devices, the warped previous estimated high-resolution image frame and the current low-resolution image frame into the machine-learned frame estimation model comprises:
  concatenating, by the one or more computing devices, a low-resolution mapping of the warped previous estimated high-resolution image frame with the current low-resolution image frame in a channel dimension; and
  feeding, by the one or more computing devices, the concatenated images to the machine-learned frame estimation model.

9. The computer-implemented method of claim 1, further comprising performing the method of claim 1 for a plurality of iterations.

10. The computer-implemented method of claim 1, further comprising:
  evaluating, by the one or more computing devices, a first loss function that evaluates a difference between the current estimated high-resolution image frame and a current ground truth high-resolution image frame; and
  training, by the one or more computing devices, the machine-learned frame estimation model based at least in part on the first loss function.

11. The computer-implemented method of claim 2, further comprising:
  evaluating, by the one or more computing devices, a first loss function that evaluates a difference between the current estimated high-resolution image frame and a current ground truth high-resolution image frame; and
  jointly training, by the one or more computing devices, both the machine-learned frame estimation model and the machine-learned flow estimation model based at least in part on the first loss function.

12. The computer-implemented method of claim 11, further comprising:
  warping, by the one or more computing devices, the previous low-resolution image frame based at least in part on the flow output by the machine-learned flow estimation model to obtain a warped version of the previous low-resolution image frame;
  evaluating, by the one or more computing devices, a second loss function that evaluates a spatial mean squared error between the warped version of the previous low-resolution image frame and the current low-resolution image frame; and
  training, by the one or more computing devices, at least the machine-learned flow estimation model based at least in part on the second loss function.

13. A computing system, comprising:
  one or more processors;
  a recurrent super-resolution model comprising a machine-learned flow estimation model and a machine-learned frame estimation model; and
  one or more non-transitory computer-readable media that store instructions that, when executed by the one or more processors, cause the computing system to perform operations, the operations comprising:
    obtaining data representing a current low-resolution frame of a video;
    obtaining data representing a previous estimated high-resolution frame of the video;
    obtaining data representing a previous low-resolution frame of the video;
    inputting the current low-resolution frame and the previous estimated high-resolution frame into the recurrent super-resolution model, wherein inputting the current low-resolution and the previous estimated high resolution frame into the recurrent super-resolution model comprises:
      inputting data representing the previous low-resolution frame of the video and data representing the current low-resolution frame of the video into the machine-learned flow estimation model;

modifying the previous estimated high-resolution frame of the video based at least in part on an output of the machine-learned flow estimation model; and inputting data representing the current low-resolution frame and the modified previous estimated high-resolution frame of the video into the machine-learned frame estimation model; and obtaining, in response to inputting the frames, an output of the recurrent super-resolution model that includes data representing a high-resolution estimate of the current low-resolution frame of the video.

14. The computing system of claim 13, wherein the operations further comprise:

displaying on a display the high-resolution estimate of the current low-resolution frame of the video that is output from the recurrent super-resolution model.

15. A non-transitory-computer-readable medium that stores instructions that when executed by one or more computing devices, cause the one or more computing devices to perform operations, the operations comprising:

obtaining data representing a previous low-resolution frame of a video and data representing a current low-resolution frame of a video;

inputting the previous low-resolution frame and the current low-resolution frame into a machine-learned flow estimation model;

obtaining, in response to inputting the previous low-resolution frame and the current low-resolution frame, an output of the machine-learned flow estimation model that includes a motion estimate of the video;

warping a previous high-resolution frame of the video based at least in part on the motion estimate of the video;

inputting the warped previous high-resolution frame and a current low-resolution frame of the video into a machine-learned frame estimation model;

obtaining a current estimated high-resolution frame as an output of the machine-learned frame estimation model;

evaluating a loss function to obtain a loss value that describes a difference between the current estimated high-resolution frame and a current ground truth high-resolution frame; and adjusting one or more parameters of the machine-learned frame estimation model to reduce the loss value, wherein adjusting one or more parameters of the machine-learned frame estimation model to reduce the loss value comprises jointly training the machine-learned flow estimation model and the machine-learned frame estimation model in an end-to-end fashion based on the loss function.

16. The non-transitory-computer-readable medium of claim 15, wherein the operations further comprise:

warping the previous low-resolution frame based at least in part on the motion estimate;

wherein the loss function further evaluates a spatial mean squared error between the warped version of the previous low-resolution frame and the current low-resolution frame.

* * * * *